US011455489B2

(12) United States Patent
Fujimori et al.

(10) Patent No.: US 11,455,489 B2
(45) Date of Patent: Sep. 27, 2022

(54) DEVICE THAT UPDATES RECOGNITION MODEL AND METHOD OF UPDATING RECOGNITION MODEL

(71) Applicant: CANON KABUSHIKI KAISHA, Tokyo (JP)

(72) Inventors: Tomotaka Fujimori, Yokohama (JP); Yusuke Mitarai, Tokyo (JP); Masafumi Takimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 16/435,002

(22) Filed: Jun. 7, 2019

(65) Prior Publication Data
US 2019/0385016 A1 Dec. 19, 2019

(30) Foreign Application Priority Data

Jun. 13, 2018 (JP) .............................. JP2018-112829

(51) Int. Cl.
G06K 9/62 (2022.01)
G06V 10/40 (2022.01)

(52) U.S. Cl.
CPC ........... *G06K 9/6234* (2013.01); *G06K 9/623* (2013.01); *G06K 9/6227* (2013.01); *G06V 10/40* (2022.01)

(58) Field of Classification Search
CPC .... G06K 9/6234; G06K 9/6227; G06K 9/623; G06K 9/46; G06K 9/6254; G06K 9/6202
USPC ......................................................... 382/224
See application file for complete search history.

(56) References Cited

U.S. PATENT DOCUMENTS

| 2012/0141017 | A1* | 6/2012 | Krupka | G06K 9/6257 |
| | | | | 382/159 |
| 2015/0169754 | A1* | 6/2015 | Gu | G06F 16/5838 |
| | | | | 707/728 |
| 2016/0292510 | A1* | 10/2016 | Han | G11B 27/06 |
| 2018/0089505 | A1* | 3/2018 | El-Khamy | G06T 7/73 |
| 2018/0225993 | A1* | 8/2018 | Buras | A61B 8/4263 |
| 2018/0306609 | A1* | 10/2018 | Agarwal | H04L 67/12 |
| 2019/0295252 | A1* | 9/2019 | Fuchs | G06N 20/00 |
| 2020/0125894 | A1* | 4/2020 | Maeda | G06K 9/6284 |
| 2020/0184216 | A1* | 6/2020 | Liu | G06N 3/08 |
| 2020/0293261 | A1* | 9/2020 | Janamanchi | H04L 12/1831 |

FOREIGN PATENT DOCUMENTS

| CN | 104899579 | * | 9/2015 | .......... G06V 40/168 |
| JP | 2004-150963 | A | 5/2004 | |
| JP | 2013-142558 | A | 7/2013 | |
| JP | 5545877 | B2 | 7/2014 | |
| JP | 6224857 | * | 11/2017 | ............. G06F 17/30 |
| WO | 2014/155690 | A1 | 10/2014 | |
| WO | WO2018140415 | * | 8/2018 | ............. G02B 27/01 |

* cited by examiner

Primary Examiner — Jerome Grant, II
(74) Attorney, Agent, or Firm — Canon U.S.A., Inc. I.P. Division

(57) ABSTRACT

An image processing device includes: a determination unit configured to determine, based on a feature amount of input image data, a category of the input image data and a score representing confidence of the category, with a classification model; a display unit configured to display an image representing the input image data and the determined category of the input image data; an acceptance unit configured to accept a correction of the displayed category from a user; and an updating unit configured to update the classification model, based on the correction of the category.

21 Claims, 11 Drawing Sheets

DEVICE THAT UPDATES RECOGNITION MODEL AND METHOD OF UPDATING RECOGNITION MODEL

BACKGROUND

Field of the Disclosure

The present disclosure generally relates to pattern recognition and more specifically to a device that updates a recognition model and a method of updating the recognition model.

Description of the Related Art

In the technology of pattern recognition, typically, processing an input pattern with a previously learned recognition model, causes calculation of a recognition score for the pattern, to determine what category the pattern belongs to. In this case, because the performance of pattern recognition depends on the performance of the recognition model, it is important that the performance of the recognition model be improved. For example, Japanese Patent No. 5545877 discloses a technique including: calculating an evaluated value referred to as a confidence score for every piece of content corresponding to a category of data; determining a method of adding a label to data in the content, on the basis of the confidence score; and updating a recognition model with the data having the label added thereto, to improve the classification performance of the recognition model.

SUMMARY

According to a first aspect of the present disclosure, an image processing device includes: a determination unit configured to determine, based on a feature amount of input image data, a category of the input image data and a score representing confidence of the category, with a classification model; a display unit configured to display an image representing the input image data and the determined category of the input image data; an acceptance unit configured to accept a correction of the displayed category from a user; and an updating unit configured to update the classification model, based on the correction of the category.

Further features of the present disclosure will become apparent from the following description of exemplary embodiments (with reference to the attached drawings).

BRIEF DESCRIPTION OF THE DRAWINGS

FIG. 2 is an illustration of an exemplary hardware configuration of an information processing device and the like.

DESCRIPTION OF THE EMBODIMENTS

Embodiments of the present disclosure will be described below on the basis of the drawings.

First Embodiment

According to the present embodiment, a task in which an information processing system inspects a captured image of an inspection object being conveyed on an inspection line and then displays an inspected result, will be described.

Figure 1:
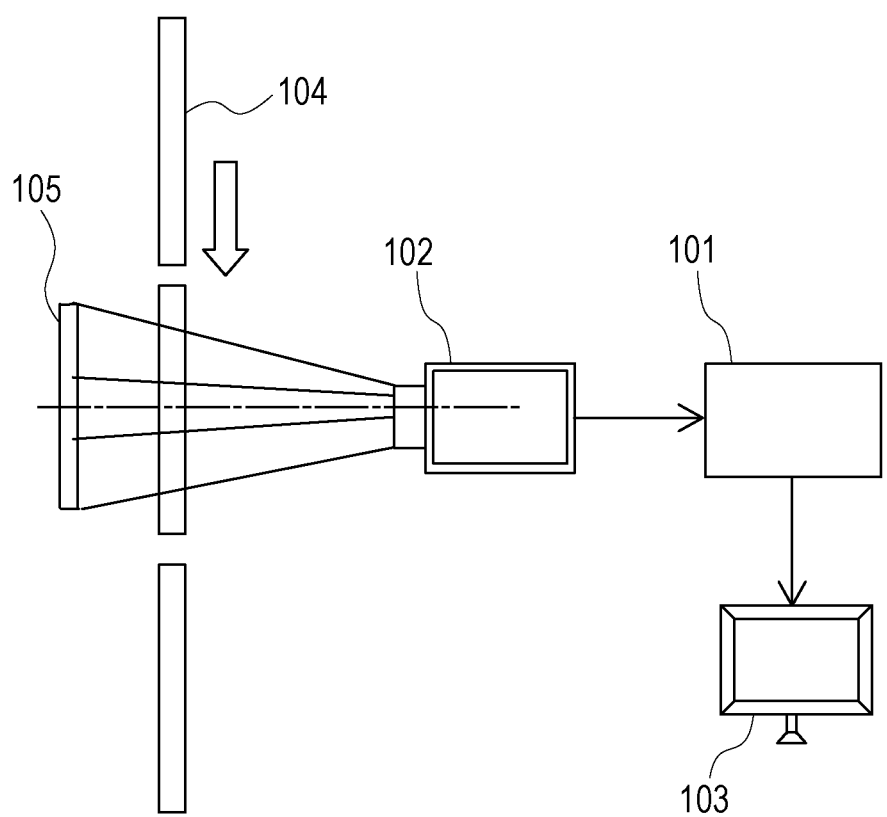
FIG. 1 is an illustration of an exemplary system configuration of an information processing system according to a first embodiment.

FIG. 1 is an illustration of an exemplary system configuration of the information processing system.

An information processing device 101 inspects an image captured by an image capturing device 102.

The image capturing device 102 captures the image of an inspection object 104.

A user interface 103 is a device that displays an inspected result of the information processing device 101 or information for prompting a user to make an input, or inputs data in accordance with a user operation. The user interface 103 including a monitor, a keyboard, and the like, displays, for example, an image indicating the inspected result transmitted from the information processing device 101 or inputs, for example, a determined result of the user to the inspected result.

The inspection object 104 is an inspection target according to the present embodiment.

A light source 105 irradiates the inspection object 104 with light. The image capturing device 102 receives the light emitted to the inspection object 104, and captures the image of the inspection target.

Figure 2:
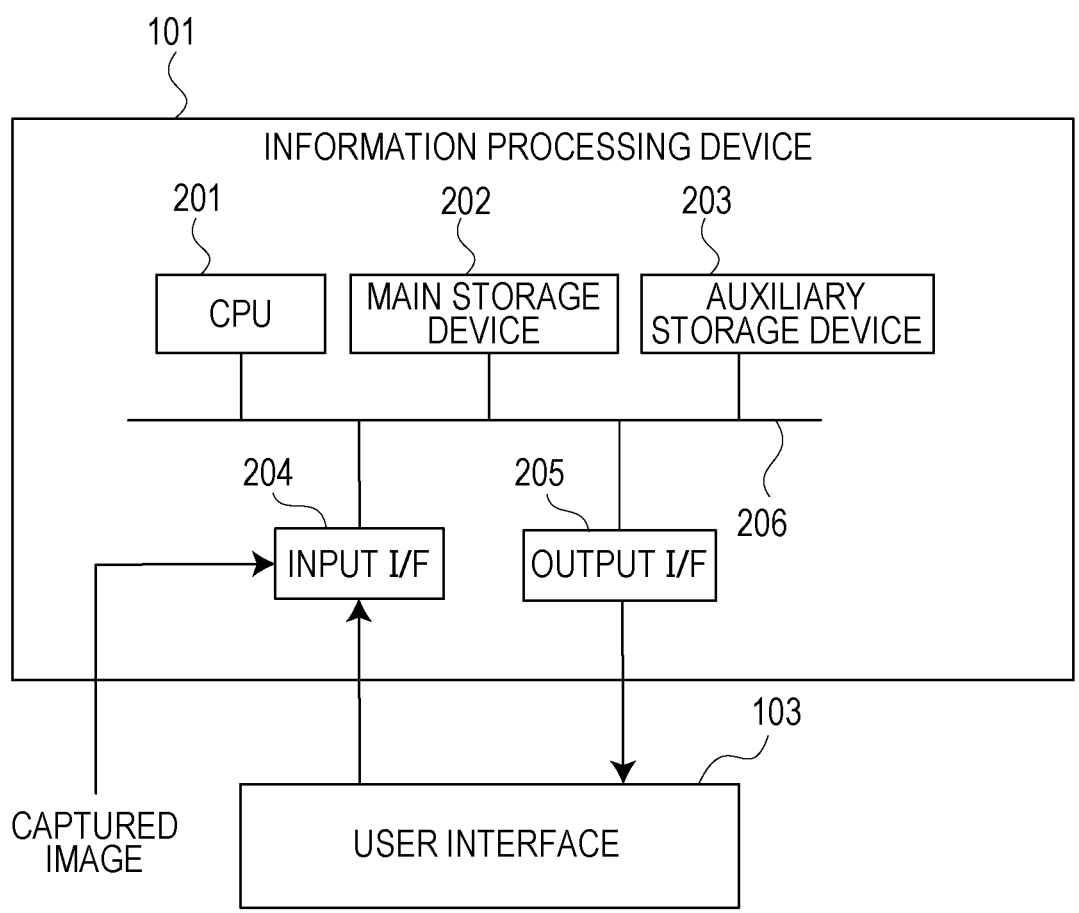

FIG. 2 is an illustration of an exemplary hardware configuration of the information processing device 101 and the like.

The information processing device 101 includes, as a hardware configuration, a CPU 201, a main storage device 202, an auxiliary storage device 203, an input I/F 204, and an output I/F 205. The CPU 201, the main storage device 202, the auxiliary storage device 203, the input I/F 204, and the output I/F 205 are connected mutually through a system bus 206.

The CPU 201 is a central processing unit that controls processing in the information processing device 101. The main storage device 202 is a storage device that functions as a work area for the CPU 201 or stores, for example, a program. The auxiliary storage device 203 is a storage device that stores data for learning to be described later, data such as various set values and various threshold values, and various programs.

The input I/F 204 is an input interface for the information processing device 101. The input I/F 204 inputs the captured image accepted from the image capturing device 102 through, for example, a network, into the CPU 201, or inputs the user operation accepted through the user interface 103, into the CPU 201.

The output I/F 205 is an output interface for the information processing device 101. The output I/F 205 outputs information regarding a detected result, to the user interface 103. The CPU 201 executes the processing on the basis of the program stored in the main storage device 202 or the auxiliary storage device 203, to achieve the functional configuration of the information processing device 101 of FIG. 2 to be described later and the processing in the flowchart of FIG. 5, 6, 7, 8, or 10 to be described later.

Figure 3:
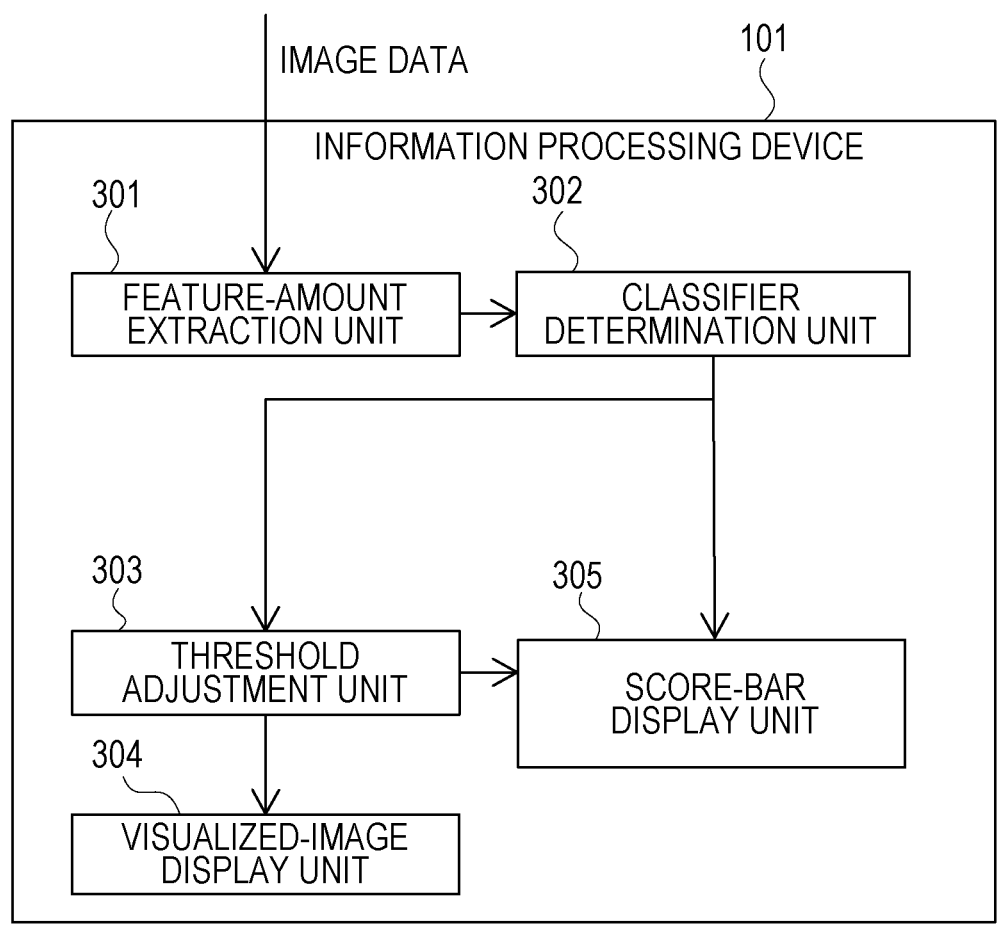
FIG. 3 is an illustration of an exemplary functional configuration of the information processing device.

FIG. 3 is an illustration of an exemplary functional configuration of the information processing device 101.

The information processing device 101 includes a feature-amount extraction unit 301, a classifier determination unit 302, a threshold adjustment unit 303, a visualized-image display unit 304, and a score-bar display unit 305.

The feature-amount extraction unit 301 acquires image data of a determination target captured by the image capturing device 102. In a case where moving-image data is input from the image capturing device 102, the feature-amount extraction unit 301 acquires a still image (frame) at the arrival of the inspection object 104 at a predetermined position. The feature-amount extraction unit 301 extracts a feature amount from the image data in an inspection target region captured by the image capturing device 102. The feature amount of the image data used in the present embodiment will be described later. The inspection target region is a region that the image capturing device 102 captures, and includes the inspection object 104.

The classifier determination unit 302 generates a normal model classifier, on the basis of the feature amount extracted by the feature-amount extraction unit 301, and calculates the recognition score of the data of the determination target, with the generated normal model classifier and the feature amount acquired from the data of the determination target. The normal model classifier here defines a normal range with only normal data and determines whether the data of the determination target is included in the normal range, to identify the normal data and the other abnormal data. The recognition score seems to be abnormal as the value is higher (high possibility of abnormality), and seems to be normal as the value is lower (high possibility of normality). The data of the determination target according to the first embodiment is data of external inspection.

The threshold adjustment unit 303 sets a threshold value to the recognition score calculated by the classifier determination unit 302. Because there are two different classes of data of normality and abnormality, the threshold adjustment unit 303 sets the threshold value to each class.

The visualized-image display unit 304 displays data that is a defective-image candidate, on the user interface 103. For example, the visualized-image display unit 304 displays the data at the two threshold values of the normal and abnormal classes set by the threshold adjustment unit 303. The visualized-image display unit 304 displays the entirety of a displayed image such that a defective portion is emphasized.

The score-bar display unit 305 arranges the data in ascending order in the recognition score calculated by the classifier determination unit 302, and displays a result on the user interface 103, on the basis of the threshold values determined by the threshold adjustment unit 303.

Figure 4:
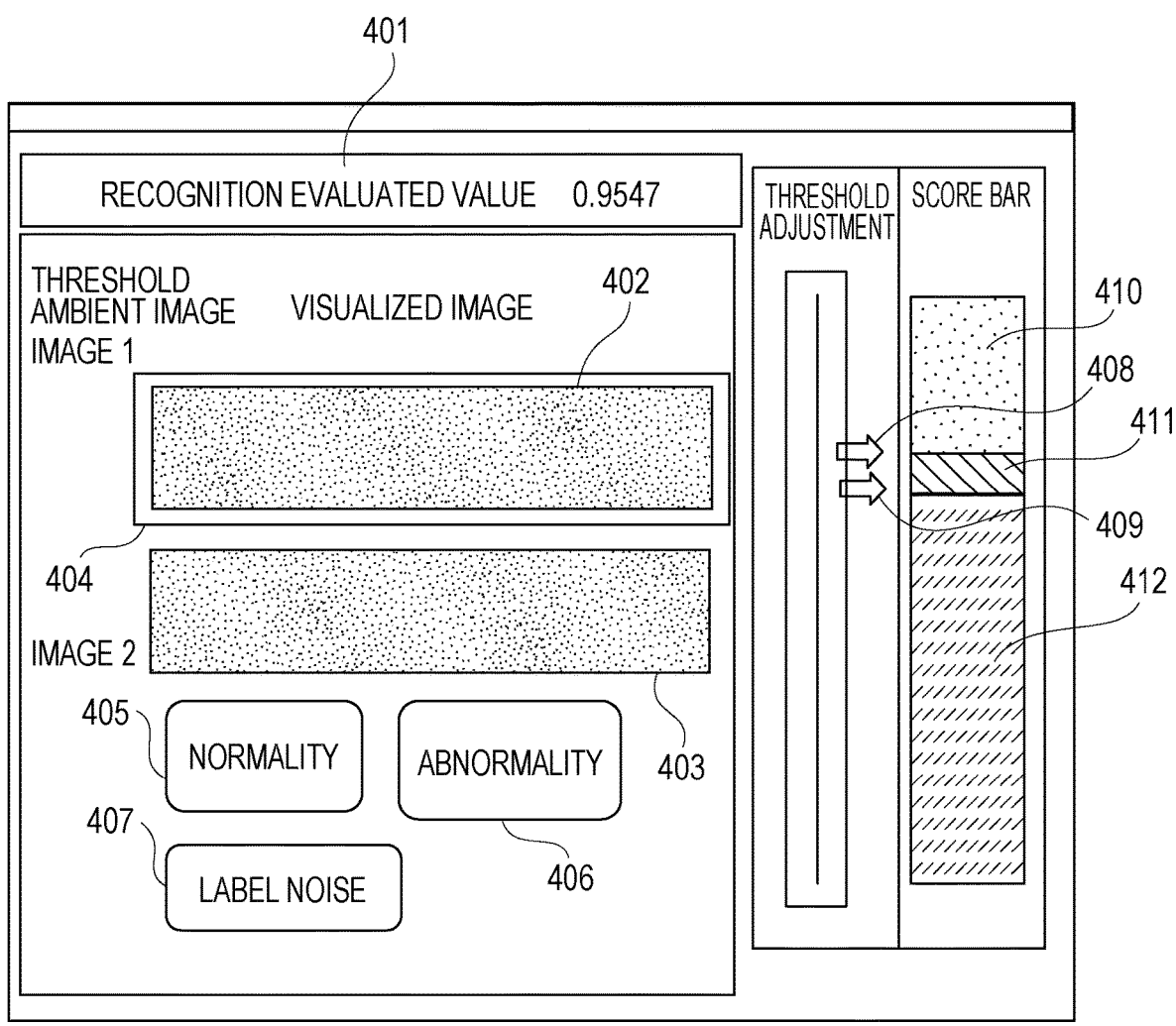
FIG. 4 is an illustration of an exemplary screen according to the first embodiment.

FIG. 4 is an illustration of an exemplary screen displayed on the user interface 103.

A recognition evaluated value 401 indicates an evaluated value of evaluation of the recognition performance of the current normal model classifier, the evaluated value resulting from calculation of the performance evaluated value of a binary classifier, for example, calculation of the evaluated value of an AUC (area under the curve drawn with a ROC curve).

In threshold determination, the user interface 103 displays, for determination of whether the threshold value is present between visualized images 402 and 403, the images visually for better viewability.

A quadrangular cursor 404 indicates that the visualized image 402 has been selected.

Buttons 405, 406, and 407 indicating buttons corresponding to the normal class, the abnormal class, and label noise, respectively, are used by the user to give the visualized image 402 a label corresponding to each class.

A cursor 408 indicates a cursor for threshold determination in a threshold adjustment function. The user can operate the cursor 408 to classify the normal data into the label set data and the classification boundary data.

A cursor 409 indicates a cursor for threshold determination in the threshold adjustment function. Similarly to the cursor 408, the user can operate the cursor 409 to classify the abnormal data into the label set data and the classification boundary data.

Score bars 410, 411, and 412 are included in a score bar. The score bar is segmented into three regions by the threshold values set by the cursors 408 and 409. The recognition score is stored for every piece of data, and the length of each region of the score bar corresponds to the volume of data. Here, the region of the score bar 410 indicates a data region corresponding to the label set data having the normal label reliably. The region of the score bar 411 indicates a data region indicating the classification boundary data at a boundary at which it is not clear whether the score bar region is normal or abnormal. The region of the score bar 412 indicates a data region corresponding to the label set data having the abnormal label reliably. The threshold adjustment unit 303 classifies the data of the determination target into label set data and classification boundary data. The label set data here indicates data having a normal label appended thereto, that is lower in recognition score than the normal threshold value, namely, seems to be normal, or data having an abnormal label appended thereto, that is higher in recognition score than the abnormal threshold value, namely, seems to be abnormal. The classification boundary data indicates data having the normal label appended thereto, that is higher in recognition score than the abnormal threshold value, namely, seems to be abnormal, or data having the abnormal label appended thereto, that is lower in recognition score than the normal threshold value, namely, seems to be normal.

Figure 5:
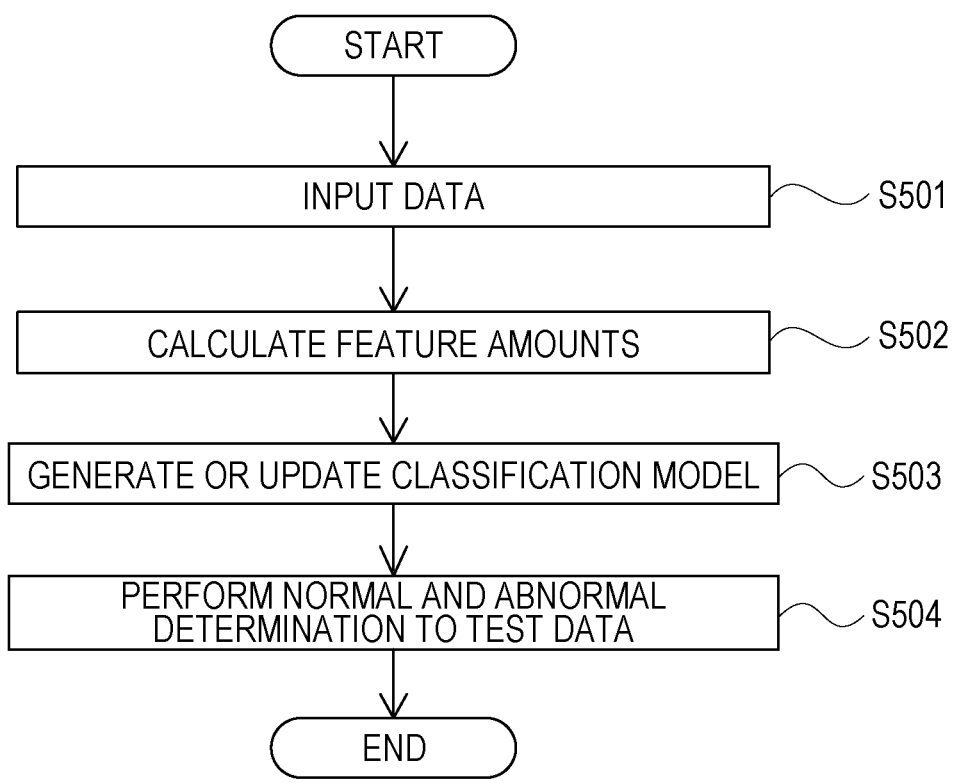
FIG. 5 is a flowchart of exemplary information processing.

FIG. 5 is a flowchart of exemplary information processing of the information processing device 101. For exemplary defect detection processing of the inspection object 104, the processing at S501 to S504 will be described.

At S501, the CPU 201 acquires the image data of the determination target captured by the image capturing device 102. The CPU 201 acquires a plurality of pieces of image data for learning, from, for example, the auxiliary storage device 203. Here, in a case where the inspection target region is part of the image, the CPU 201 acquires only the inspection target region in the image, as an evaluation target. The image data for learning is assumed to be supervised learning data having in advance a label indicating normality or abnormality, appended thereto.

At S502, the CPU 201 extracts the feature amount from the inspection target region of the image data of the determination target acquired at S501 (hereinafter, referred to as an input image).

In a case where a plurality of feature amounts is used, for example, the CPU 201 performs the Haar Wavelet transform to the inspection target region of the target image, to generate hierarchical converted images. The Haar Wavelet transform processing is the processing of transforming image data in frequency with positional information retained. According to the present embodiment, the CPU 201 uses the Haar Wavelet transform processing as the processing of calculating the feature amount of the image data acquired at S501.

The CPU 201 calculates the maximum value, the average value, and the standard deviation in pixel value as the feature amount, individually to overall N number of types of images generated with the Haar Wavelet transform processing from one input image. That is the CPU 201 generates overall N number of types of images from one input image, and extracts three types of statistical feature amounts for each generated image. As a result, the CPU 201 extracts overall 3N number of feature amounts from one input image.

Thus, the processing at S502 enables the CPU 201 to extract a plurality of feature amounts from the input image and the data for learning. The feature amounts of the data for learning may be calculated in advance and may be stored in the auxiliary storage device 203.

At S503, the CPU 201 generates or updates a classification model to be described later, with the feature amounts calculated at S502.

Here, the method of projection distance that is an exemplary subspace method, is used for generation of the classification model. Briefly, the projection distance is the shortest distance between the feature vector in feature space having the feature amounts each as an axis and a hyperplane (principal plane) having an orientation at which dispersion is maximum in the distribution of patterns. Here, the CPU 201 performs discrimination between the normal data and the abnormal data, with the generated or updated classification model.

At S504, the CPU 201 performs normal and abnormal determination to test data, with the classification model generated or updated at S503. More specifically, the CPU 201 performs feature-amount extraction on the test data, and performs the normal and abnormal determination with the classification model generated or updated at S503. Here, the CPU 201 calculates the projection distance to the test data, and performs the normal and abnormal determination after performing threshold processing.

Figure 6:
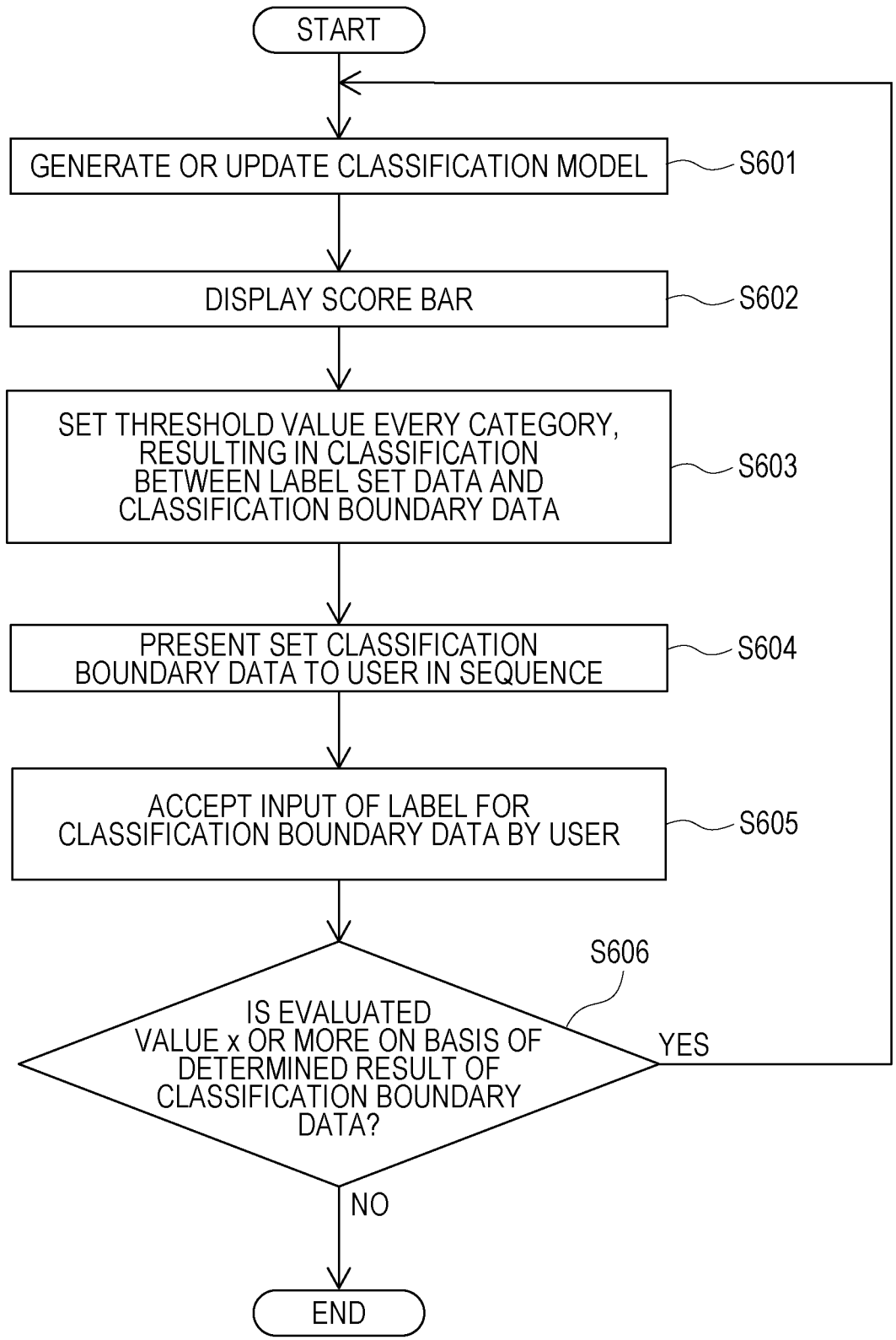
FIG. 6 is a flowchart of exemplary generation/update of a classification model according to the first embodiment.

A flowchart regarding a method of generating or updating the classification model at S503, is illustrated in FIG. 6. FIG. 6 is a flowchart of exemplary generation/update processing of the classification model according to the first embodiment. The processing from S601 to S606 will be described.

At S601, the CPU 201 generates or updates the classification model. For generation of the classification model, the CPU 201 performs learning to the feature amounts calculated at S502. For update of the classification model that has been already generated, the CPU 201 updates the classification model, with both of the label set data and the classification boundary data having a label appended thereto at S605.

At S602, the CPU 201 calculates the recognition score to the learning data or the test data, with the classification model generated at S601, sorts the data in ascending order in the calculated recognition score, and displays a result of the sort on the user interface 103.

At S603, the CPU 201 sets the threshold value for each set of data of the normal class and the abnormal class, resulting in classification between the label set data and the classification boundary data.

For allowing the user to determine the label set data of the normal data while viewing the recognition score of the test data indicated at the score bar, for classification between the label set data and the classification boundary data, the CPU 201 determines the label set data of the normal data as in (Expression 1) with respect to the data having the lowest value of the recognition score in the abnormal data.

$$\text{OKDataScore} < \min(\text{Score}(NG)) \quad \text{(Expression 1)}$$

where OKDataScore represents the recognition score of the normal data, and indicates determination of the label set data of the normal data with respect to the data having the lowest value in the recognition score of the abnormal data.

For allowing the user to determine the label set data of the abnormal data while viewing the recognition score of the test data indicated at the score bar, the CPU 201 determines the label set data of the abnormal data as in (Expression 2) with respect to the data having the highest value of the recognition score in the normal data.

$$NG\text{DataScore} > \max(\text{Score}(OK)) \quad \text{(Expression 2)}$$

where NGDataScore represents the recognition score of the abnormal data, and indicates determination of the label set data of the abnormal data with respect to the data having the highest value in the recognition score of the normal data.

At S604, the CPU 201 presents the classification boundary data set at S603, to the user in sequence, and causes the user to determine whether the presented data belongs to normality or abnormality. The processing at S604 is exemplary display control processing of displaying the classification boundary data on the screen.

(S605: Acceptance of Input of Label for Classification Boundary Data by User)

At S605, the CPU 201 accepts input of a label for the classification boundary data by the user through the user interface 103 to the classification boundary data presented at S604. The user verifies the image on the user interface 103 or verifies the actual inspection object, to determine a label for the classification boundary data.

At S606, the CPU 201 determines whether the evaluated value is a threshold value (x according to the present embodiment) or more, with a result of the label of the classification boundary data appended at S605. When the evaluated value is x or more, the CPU 201 goes back to S601 and updates the classification model. When the evaluated value is less than x, the CPU 201 finishes the processing of the flowchart illustrated in FIG. 6 without updating the classification model. The processing at S606 is exemplary processing of determining whether the evaluated value is the threshold value or more.

With the performance evaluated value of a binary classifier as the evaluated value, for example, the CPU 201 draws a ROC curve from the arrangement between the label of the data appended in advance at S501 and the determined result of the label input at S605, and calculates an area under the curve for the evaluated value (AUC: area under the ROC curve) on the basis of the drawn ROC curve. Here, when the calculated AUC is x or more, the CPU 201 goes back to S601 and updates the classification model. When the evaluated value is less than x, the CPU 201 finishes the processing of the flowchart illustrated in FIG. 6 without updating the classification model. Although using an AUC as the evaluated value, the CPU 201 may use F-measure that is the harmonic mean between precision and recall, as the evaluated value.

As described above, according to the present embodiment, the user sets the threshold parameter for every category of data, and determines whether the determination between normality and abnormality by the information processing device is correct to the data at the boundary between the categories. This arrangement enables reduction of the target for re-execution of the visual-inspection and generation of the classification model having high accuracy. As a result, the information processing device 101 can perform recognition processing with higher accuracy.

According to the first embodiment, the information processing system sets the threshold parameter for the data for every category, determines whether the determination between normality and abnormality of the user is correct to the data at the boundary between the categories, and generates the classification model.

In contrast to this, an information processing system according to a second embodiment will be described that determines, in a case where learning data includes data including label noise with a wrong label appended thereto, whether to update a classification model, and determines which piece of data is to be used for update of the classification model.

The system configuration of the information processing system and the hardware configuration and functional configuration of an information processing device 101 according to the second embodiment, are similar to those according to the first embodiment.

Figure 7:
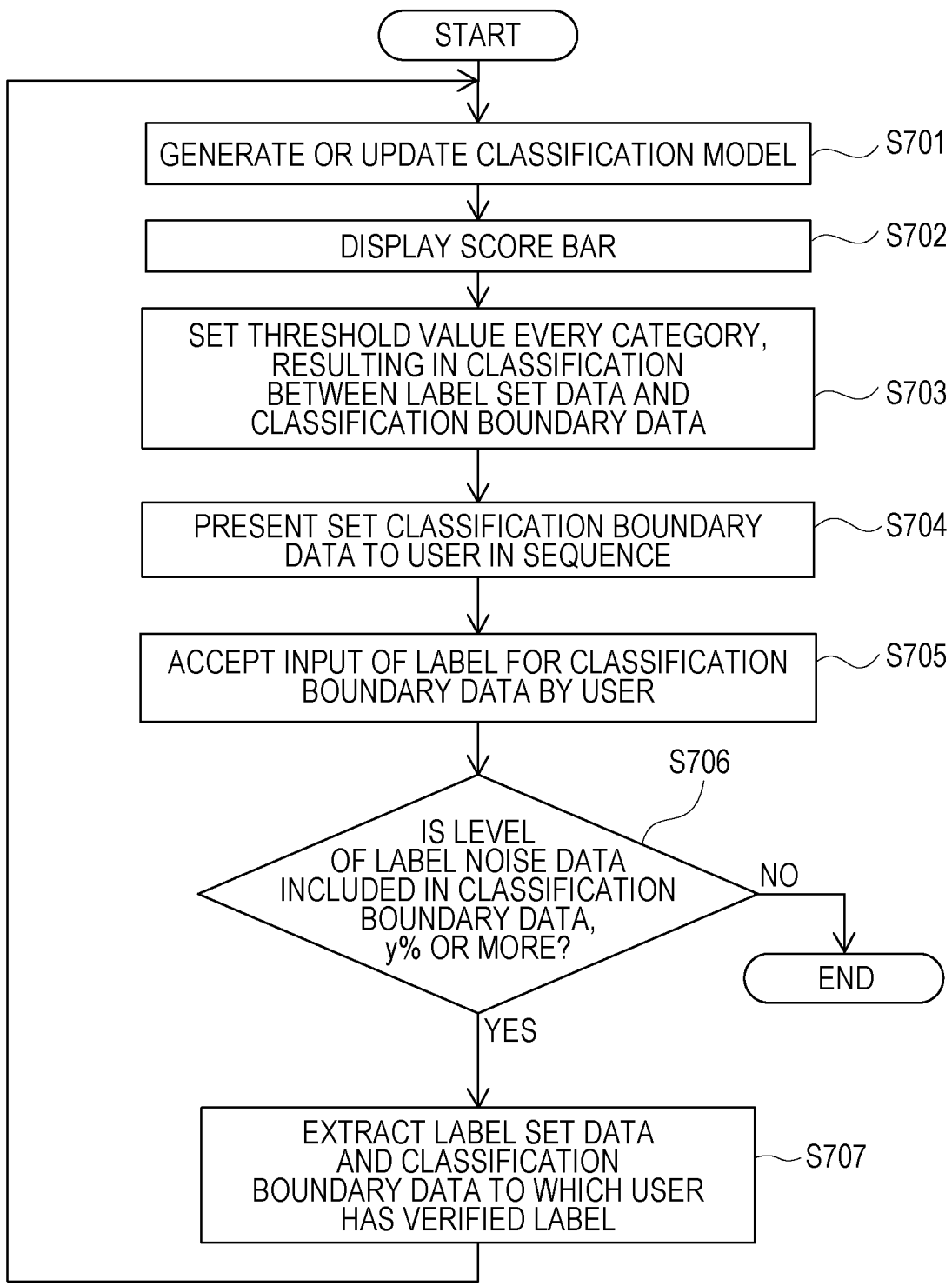
FIG. 7 is a flowchart of exemplary generation/update of a classification model according to a second embodiment.

FIG. 7 is a flowchart of exemplary generation/update processing of the classification model according to the second embodiment. Note that the processing at S701, S702, S704, and S705 of FIG. 7 is the same as the processing at S601, S602, S604, and S605 of FIG. 6.

At S703, a CPU 201 sets a threshold value for each set of data of a normal class and an abnormal class, resulting in classification between label set data and classification boundary data.

For allowing a user to determine the label set data of the normal data while viewing the recognition score of test data indicated at a score bar, for classification between the label set data and the classification boundary data, the CPU 201 determines the label set data of the normal data as in (Expression 3) with respect to the data having the lowest value of the recognition score in the abnormal data.

$$\text{OKDataScore} < \min(\text{Score}(NG)) - \alpha (\alpha > 0) \quad \text{(Expression 3)}$$

where OKDataScore represents the recognition score of the normal data and α represents a positive constant, indicating setting of the threshold value with respect to the data having the lowest value of the recognition score in the abnormal data. Because α is a positive constant, the label set data of the normal data is set less than that in (Expression 1).

For allowing the user to determine the label set data of the abnormal data while viewing the recognition score of the test data indicated at the score bar, the CPU 201 determines the label set data of the abnormal data as in (Expression 4) with respect to the data having the highest value of the recognition score in the normal data, for the threshold value of the abnormal data.

$$\text{NGDataScore} > \max(\text{Score}(OK)) + \beta (\beta > 0) \quad \text{(Expression 4)}$$

where NGDataScore represents the recognition score of the abnormal data and β represents a positive constant, indicating setting of the threshold value with respect to the data having the highest value in the recognition score of the normal data. Because β is a positive constant, the label set data of the abnormal data is set less than that in (Expression 2).

At S706, the CPU 201 determines whether the level of the label noise is a threshold value (y % according to the present embodiment) or more, with a result of the label of the classification boundary data appended at S705. When the level of the label noise is y % or more, the CPU 201 proceeds to S707. When the level of the label noise is less than y %, the CPU 201 finishes the processing of the flowchart illustrated in FIG. 7. The processing at S706 is exemplary processing of determining whether the level of label-noise data is the threshold value or more.

At S707, the CPU 201 extracts the label set data and the classification boundary data to which the user has verified the label. Then, the CPU 201 goes back to S701 and updates the classification model.

Because use of the data having the label noise is unfavorable for update of the classification model, only the classification boundary data excluding the label-noise data is used for update of the classification model with no use of the data having the label noise. This processing is exemplary processing in which the CPU 201 removes the label-noise data from the target learning data and updates the classification model.

As described above, according to the second embodiment, even in a case where the learning data includes the data having the label noise, the information processing system determines whether to update the classification model, and generates the classification model only for the data included in update of the classification model. This arrangement enables generation of the classification model having higher accuracy.

According to the first embodiment, the information processing system sets the threshold parameter every category of data, determines whether the determination between normality and abnormality of the user is correct to the data at the boundary between the categories, and generates the classification model having high accuracy.

In contrast to this, an information processing system according to a third embodiment will be described that semiautomatically sets a label for classification boundary data so as to make a re-visual-inspection target less.

The system configuration of the information processing system and the hardware configuration and functional configuration of an information processing device 101 according to the present embodiment are similar to those according to the first embodiment.

Figure 8:
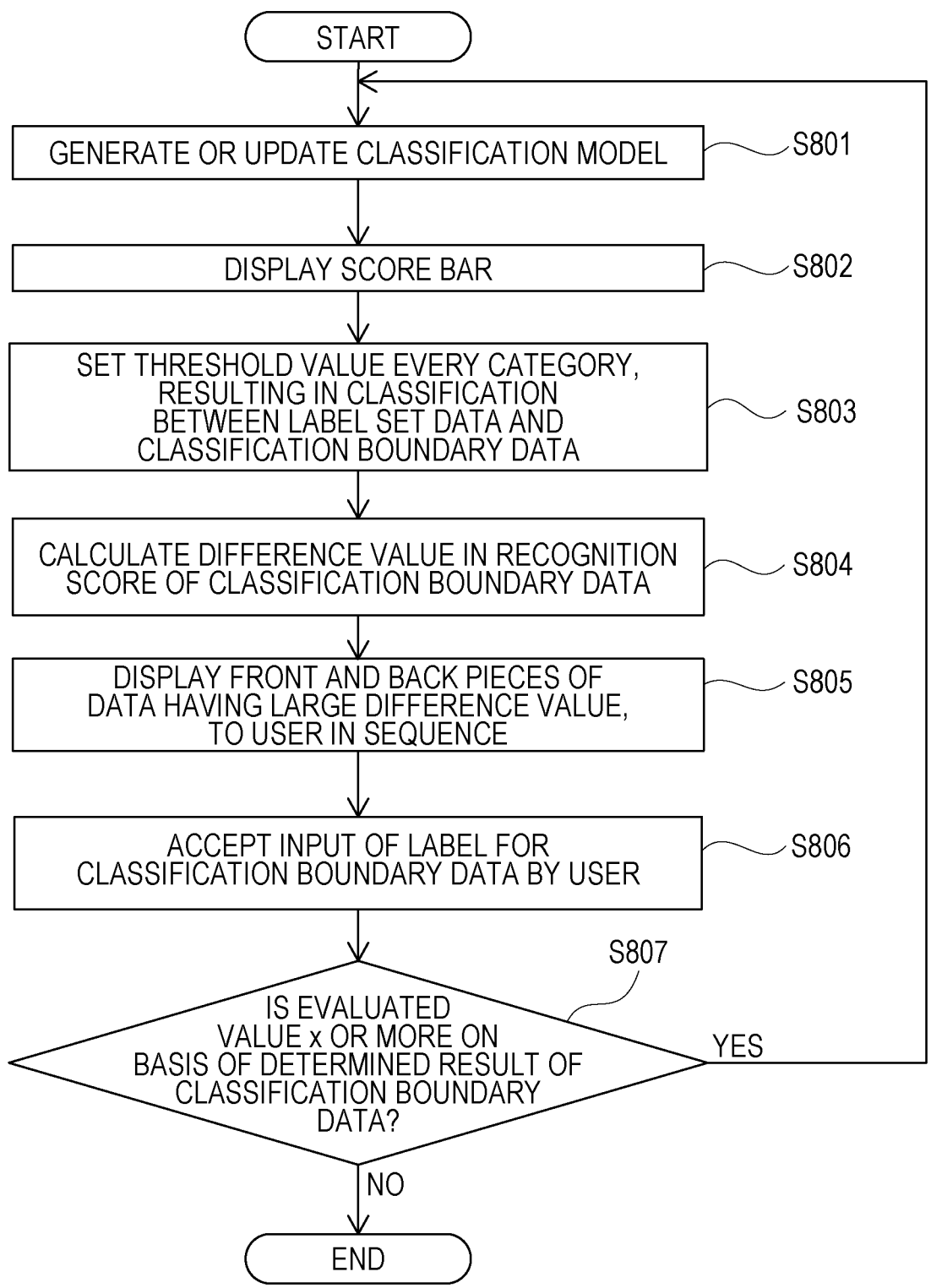
FIG. 8 is a flowchart of exemplary generation/update of a classification model according to a third embodiment.

FIG. 8 is a flowchart of exemplary generation/update processing of a classification model according to the third embodiment. Note that the processing at S801, S802, S803, S806, and S807 of FIG. 8 is the same as the processing at S601, S602, S603, S605, and S606 of FIG. 6.

At S804, a CPU 201 calculates a difference value in the recognition score of the classification boundary data.

At S805, the CPU 201 displays, for the classification boundary data arranged in the order of recognition score, the adjacent front and back pieces of data having a difference value larger in the recognition score than a predetermined value, in sequence, on a user interface 103. Generally, it is considered that the difference value increases for the threshold value for classification between normality and abnormality, in the classification boundary data arranged in the order of recognition score. Therefore, while viewing the difference value in the recognition score between the pieces of data, a user can grasp where the threshold value for classification between normality and abnormality is present in the classification boundary data.

Although displaying the adjacent front and back pieces of data having a difference value larger in the recognition score than the predetermined value in sequence, the CPU 201 may combine the adjacent front and back pieces of data having a difference value smaller in the recognition score than the predetermined value, in sequence, so as not to display the data. This arrangement causes the CPU 201 to display in sequence two pieces of data having a recognition score not subjected to the combining, at the threshold value.

As described above, according to the third embodiment, the re-visual-inspection target is made less, and the classification model is generated. As a result, the information processing system can perform recognition processing with higher accuracy.

According to the first embodiment, the task in which an information processing system inspects a captured image of an inspection object being conveyed on an inspection line and then displays an inspected result, has been described.

In contrast to this, according to a fourth embodiment, a technique of improving the accuracy of a classification model for detection of an abnormal behavior in a case where an information processing system is practically used for abnormal behavior detection, will be described. Data of a determination target according to the fourth embodiment, is data of abnormal behavior detection.

Figure 9:
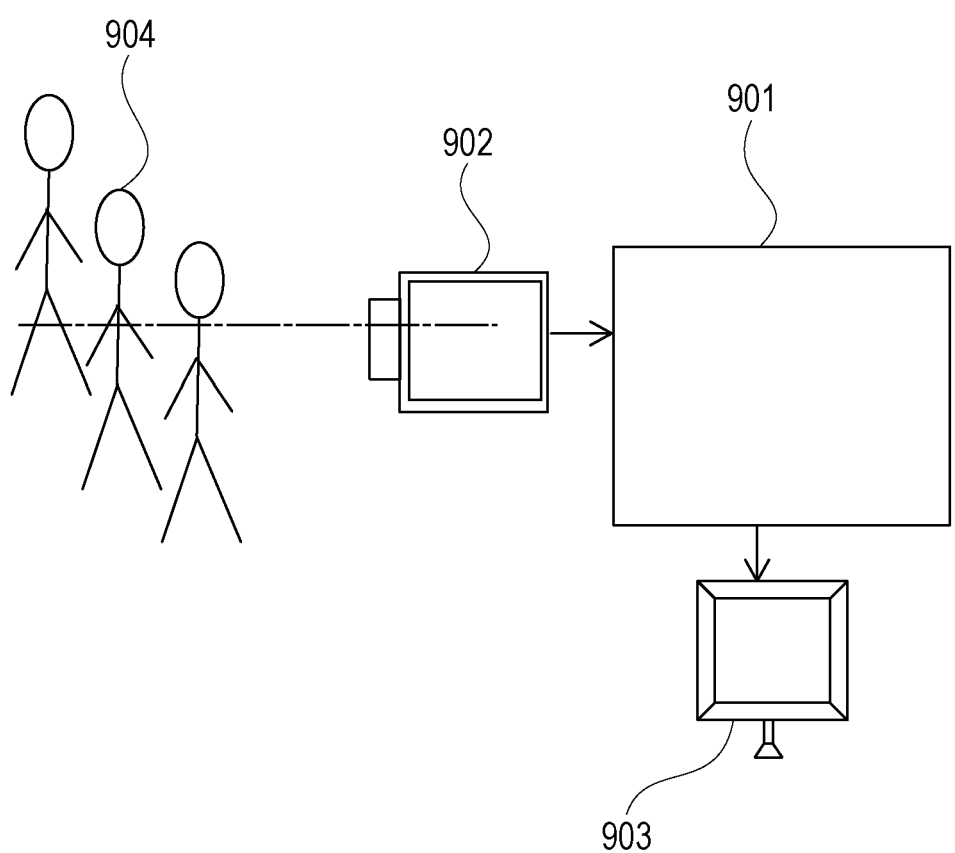
FIG. 9 is an illustration of an exemplary system configuration of an information processing system according to a fourth embodiment.

FIG. 9 is an illustration of an exemplary system configuration of the information processing system according to the fourth embodiment.

The information processing device 901 detects a human figure who is conducting an abnormal behavior, from a moving image as a target. An image captured by an image capturing device 902, is input to the information processing device 901.

The image capturing device 902 captures the image of an inspection object.

A user interface 903 is a device that displays an abnormal-behavior detected result or information for prompting a user to make an input, or inputs data in accordance with a user operation. The user interface 903 including a monitor, a keyboard, and the like, displays a recognized result transmitted from the information processing device 101 or inputs, for example, a determined result of the user to the recognized result.

An abnormal-behavior monitoring target 904 is a person who is an abnormal-behavior monitoring target for the image capturing device 902. The hardware configuration of the information processing device 901 is similar to that according to the first embodiment.

Figure 10:
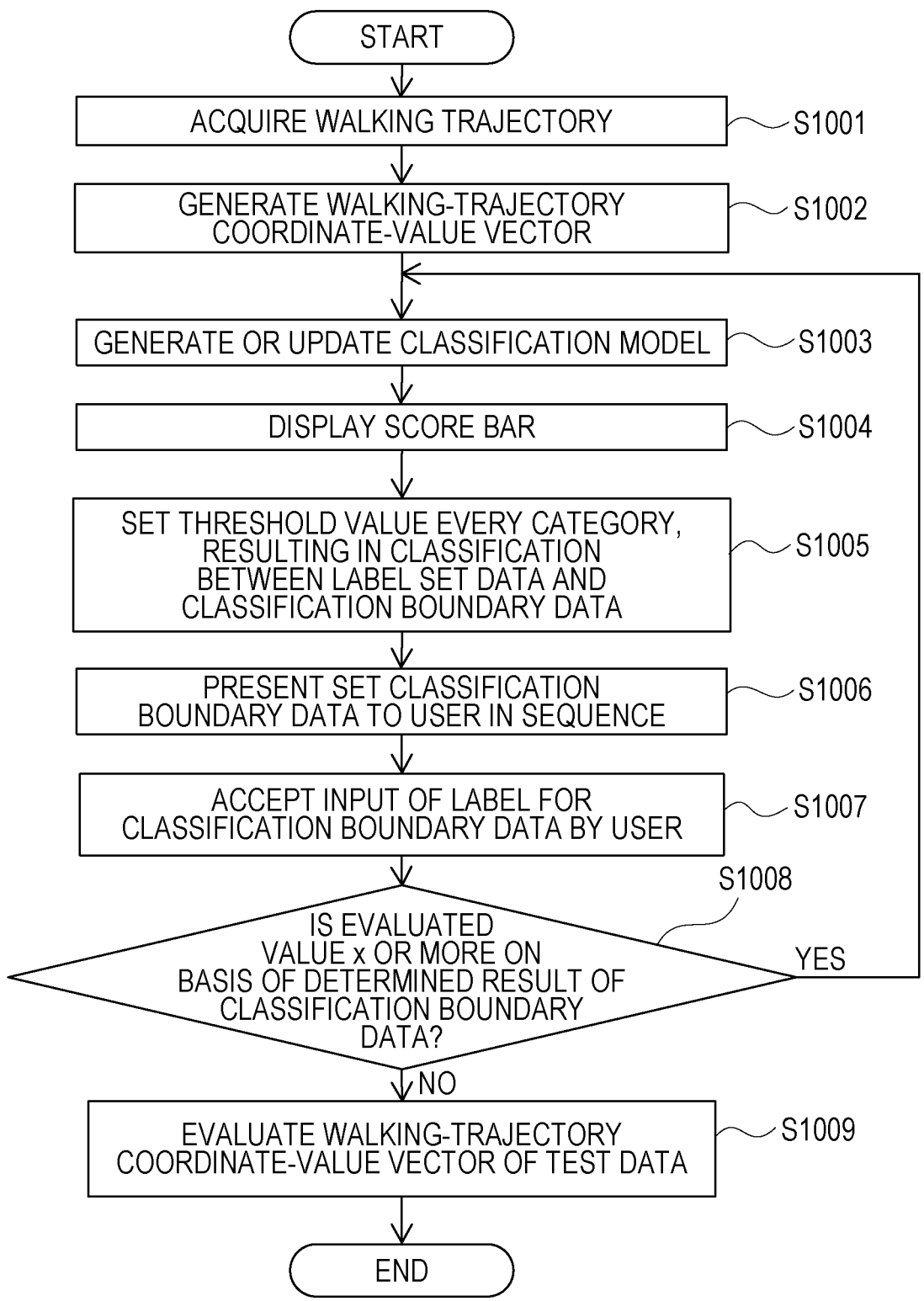
FIG. 10 is a flowchart of exemplary generation/update of a classification model according to the fourth embodiment.

FIG. 10 is a flowchart of exemplary generation/update processing of the classification model according to the fourth embodiment. The processing from S1001 to S1009 will be described.

The processing at S1003, S1004, S1005, S1006, S1007, and S1008 of FIG. 10 is the same as the processing at S601, S602, S603, S604, S605, and S606 of FIG. 6 illustrated in the first embodiment, and thus the description thereof will be omitted.

At S1001, a CPU 201 acquires a walking trajectory with, for example, optical flow every person i (i=1, 2, ..., N) from a plurality of pieces of image data.

At S1002, because the two-dimensional coordinates input at time t is expressed as $P_t=(p_{xt}, p_{yt})$, the CPU 201 considers the walking-trajectory coordinate-value vector $y_i$, having a magnitude of 2M with M number of the movement trajectories $P_t$ arranged per person. Note that, because the length of the walking-trajectory coordinate-value vector varies depending on the length of capturing time, the CPU 201 reduces the image at regular intervals to normalize the length of the walking-trajectory coordinate-value vector $y_i$ to 2M.

Next, the CPU 201 calculates a walking-trajectory coordinate-value matrix, on the basis of the set walking-trajectory coordinate-value vector. The average value $C_i$ of $y_i$ is calculated to the person. The method of calculating the average value is expressed by (Expression 5).

$$C_i = \frac{1}{M} \times \sum_{i=1}^{M} yi \qquad \text{(Expression 5)}$$

The CPU 201 subtracts the average value $C_i$ from each element of the walking-trajectory coordinate-value vector $y_i$. The CPU 201 performed this processing to each person, to calculate $y_1, y_2, \ldots, y_n$ as an input vector.

At S1009, the CPU 201 determines whether abnormal behavior detection of test data has been performed, with the classification model generated at S1002. Here, similarly to S504, the method of projection distance that is an exemplary subspace method, is used for generation of the classification model.

Figure 11:
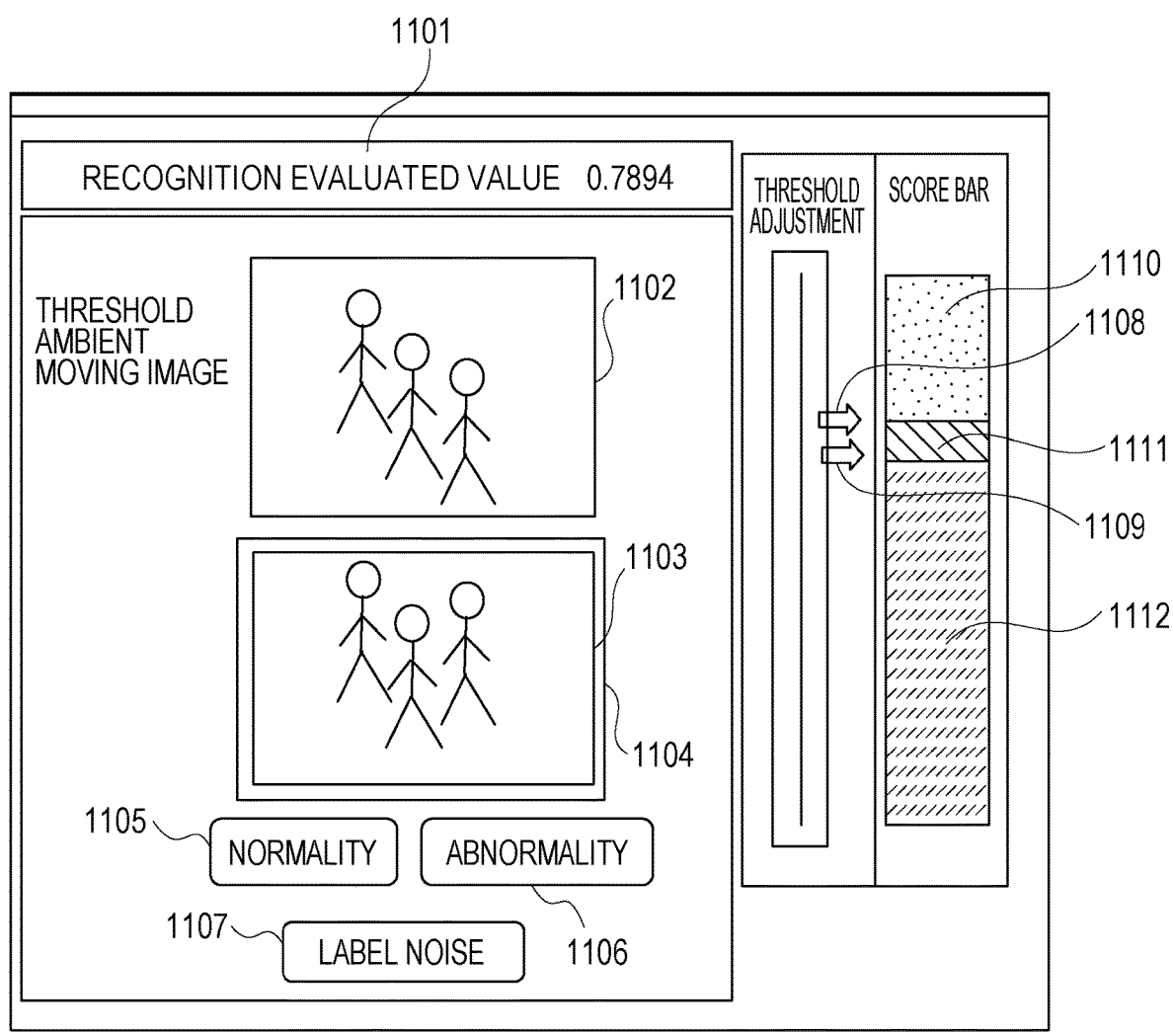
FIG. 11 is an illustration of an exemplary screen according to the fourth embodiment.

FIG. 11 is an illustration of the external appearance of the user interface 903 according to the fourth embodiment.

A recognition evaluated value 1101 indicates an evaluated value resulting from calculation of the performance evaluated value of a binary classifier, for example, calculation of the evaluated value of an AUC.

In threshold determination, moving images 1102 and 1103 indicate visualized moving images that facilitate visualization of whether a threshold value is present between the moving images 1102 and 1103.

A quadrangular cursor 1104 indicates that the moving image 1103 has been selected.

Buttons 1105, 1106, and 1107 indicating buttons corresponding to a normal class, an abnormal class, and label noise, respectively, are used by the user to give the moving image 1103 a label corresponding to each class.

A cursor 1108 indicates a cursor for threshold determination in a threshold adjustment function. The user can operate the cursor 1108 to classify normal behavior data into label set data and classification boundary data.

A cursor 1109 indicates a cursor for threshold determination in the threshold adjustment function. Similarly to the cursor 1108, the user can operate the cursor 1109 to classify abnormal behavior data into label set data and classification boundary data.

Score bars 1110, 1111, and 1112 are included in a score bar. The score bar is segmented into three regions by the threshold values set by the cursors 1108 and 1109. A recognition score is stored for every piece of data, and the length of each region of the score bar corresponds to the volume of data. Here, the region of the score bar 1110 indicates a data region corresponding to the label set data having the normal behavior reliably. The region of the score bar 1111 indicates a data region indicating the classification boundary data at a boundary at which it is not clear whether the behavior belongs to the normal behavior or the abnormal behavior. The region of the score bar 1112 indicates a data region corresponding to the label set data having the abnormal behavior reliably.

As described above, according to the fourth embodiment, the information processing system can be practically used not only for a task of external inspection but also for a task of abnormal behavior detection. In the task of abnormal behavior detection, re-labeling is performed and the threshold parameter is set for every category of data, and then the user determines whether the determination between normality and abnormality by the information processing device is correct to the data at the boundary between the categories. This arrangement enables restraint of the time and effort of re-labeling and generation of the classification model having high accuracy, in the task of abnormal behavior detection.

The exemplary embodiments of the present disclosure have been described in detail above, but the present disclosure is not limited to the specific embodiments.

The present disclosure may be carried out with a combination of any embodiments.

According to each embodiment described above, provided can be the technology in which active learning is performed with update of the classification model based on the input of the user with the data for prompting the user to make an input, presented as little as possible.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-112829, filed Jun. 13, 2018, which is hereby incorporated by reference herein in its entirety.

What is claimed is:

1. An image processing device comprising:
one or more processors,
wherein the one or more processors function as:
an estimation unit configured to cause a category classification model learned based on learning data to estimate a category of input image data input to the category classification model and a score representing confidence of the category;
a display control unit configured to cause a display unit to display an image representing the input image data and the estimated category with the score below a threshold value estimated by the category classification model of the input image data;
an acceptance unit configured to accept a correction of the displayed category from a user; and
an updating unit configured to update the category classification model to an updated category classification model by adding image data of a corrected category based on the correction accepted by the acceptance unit and the corrected category to the learning data and performing additional learning, wherein the updated category classification model outputs the corrected category when the image data of the corrected category is input.

2. The image processing device according to claim 1, wherein the estimation unit causes the estimation of the category, based on a threshold value to the score.

3. The image processing device according to claim 1, wherein the score represents confidence of a first category, and the estimation unit causes the estimation of the category of the input image data having the score that is equal to or greater than a first threshold value, as the first category, and the category of the input image data having the score less than a second threshold value, as a second category.

4. The image processing device according to claim 1, wherein the estimation unit causes the estimation of the category of the input image data having the score that is equal to or greater than a first threshold value, as a first category, and the category of the input image data having the score less than a second threshold value, as a second category.

5. The image processing device according to claim 4, wherein the estimation unit estimates that the input image data having the score that is equal to or greater than the second threshold value and is less than the first threshold value, as a boundary data having no set category.

6. The image processing device according to claim 5, wherein the display control unit causes the display unit to display the input image data estimated as the boundary data and the estimated category of the input image data caused by the estimation unit.

7. The image processing device according to claim 2, wherein the display control unit causes the display unit to display a plurality of pieces of the input image data having the score near the threshold value and the estimated category of each piece of the input image data.

8. The image processing device according to claim 1, wherein the display control unit causes the display unit to further display a distribution regarding the score of a plurality of pieces of the input image data.

9. The image processing device according to claim 1, wherein the display control unit causes the display unit to further display a segment of the category regarding the score of a plurality of pieces of the input image data.

10. The image processing device according to claim 9, further comprising:
an adjustment unit configured to adjust a threshold value to the score with a change of the segment of the category displayed by the display unit.

11. The image processing device according to claim 1, further comprising:
a discrimination unit configured to discriminate whether the updating unit updates the category classification model.

12. The image processing device according to claim 11, wherein the discrimination unit discriminates whether the category classification model is to be updated, based on a performance of the category classification model.

13. The image processing device according to claim 11, wherein the discrimination unit discriminates whether the updating unit updates the category classification model, based on a level of wrong category data from the correction of the category.

14. The image processing device according to claim 13, wherein the discrimination unit discriminates that the updating unit updates the category classification model, in a case where the level of wrong category data is equal to or greater than a threshold value.

15. The image processing device according to claim 13, wherein the updating unit removes the wrong category data from target learning data and updates the category classification model.

16. The image processing device according to claim 5, wherein the display control unit causes the display unit to display, in sequence, continuous boundary data having a difference value larger in the score than a predetermined value in order of the score in the boundary data.

17. The image processing device according to claim 1, wherein the estimation unit causes the estimation of whether the input image data belongs to a normal category or an abnormal category.

18. The image processing device according to claim 17, wherein the display control unit identifies and causes the display unit to display an abnormal part in the image representing the input image data estimated as the abnormal category.

19. An information processing method executed by an information processing device comprising:
 estimating, using a category classification model learned based on learning data, a category of input image data input into the category classification model and a score representing confidence of the category;
 displaying an image representing the input image data and the estimated category with the score below a threshold value estimated by the category classification model of the input image data;
 accepting a correction of the displayed category from a user; and
 updating the category classification model to an updated category classification model by adding image data of a corrected category based on the correction accepted by the accepting step and the corrected category to the learning data and performing additional learning, wherein the updated category classification model outputs the corrected category when the image data of the corrected category is input.

20. A non-transitory computer-readable storage medium storing a program for causing a computer to perform an information processing method comprising:
 estimating, using a category classification model learned based on learning data, a category of input image data input into the category classification model and a score representing confidence of the category;
 displaying an image representing the input image data and the estimated category with the score below a threshold value estimated by the category classification model of the input image data;
 accepting a correction of the displayed category from a user; and
 updating the category classification model to an updated category classification model by adding image data of a corrected category based on the correction accepted by the accepting step and the corrected category to the learning data and performing additional learning, wherein the updated category classification model outputs the corrected category when the image data of the corrected category is input.

21. An image processing device comprising:
 one or more processors,
 wherein the one or more processors function as:
 an estimation unit configured to cause a category classification model learned based on learning data to output an estimated input image data input to the category classification model and a score representing confidence of the category, and to estimate the category of the input image data having the score that is equal to or greater than a first threshold value, as a first category, and to estimate the category of the input image data having the score less than a second threshold value, as a second category, wherein input image data not estimated as the first category or second category is determined as boundary image data;
 a display control unit configured to cause a display unit to display an image representing one or more boundary image data whose score is equal to or greater than the second threshold value and less than the first threshold value;
 an acceptance unit configured to accept category input for the displayed boundary image data from a user; and
 an updating unit configured to update the category classification model to an updated category classification model by adding the boundary image data and the corrected category accepted for the boundary image data by the acceptance unit to the learning data and performing additional learning, wherein the updated category classification model outputs the corrected category when the image data of the corrected category is input.

* * * * *